US011640702B2

(12) United States Patent
Desprez

(10) Patent No.: US 11,640,702 B2
(45) Date of Patent: May 2, 2023

(54) STRUCTURALLY MATCHING IMAGES BY HASHING GRADIENT SINGULARITY DESCRIPTORS

(71) Applicant: SOLYSTIC, Bagneux (FR)

(72) Inventor: Olivier Desprez, Versailles (FR)

(73) Assignee: SOLYSTIC, Bagneux (FR)

( * ) Notice: Subject to any disclaimer, the term of this patent is extended or adjusted under 35 U.S.C. 154(b) by 319 days.

(21) Appl. No.: 16/652,799

(22) PCT Filed: Dec. 19, 2019

(86) PCT No.: PCT/EP2019/086413
§ 371 (c)(1),
(2) Date: Apr. 1, 2020

(87) PCT Pub. No.: WO2020/136091
PCT Pub. Date: Jul. 2, 2020

(65) Prior Publication Data
US 2021/0044424 A1 Feb. 11, 2021

(30) Foreign Application Priority Data
Dec. 27, 2018 (FR) ...................... 1874212

(51) Int. Cl.
*G06V 10/25* (2022.01)
*G06V 30/424* (2022.01)
(Continued)

(52) U.S. Cl.
CPC ............ *G06V 30/424* (2022.01); *G06T 7/337* (2017.01); *G06V 10/25* (2022.01); *H04L 9/0643* (2013.01)

(58) Field of Classification Search
CPC ...... G06V 30/424; G06V 10/25; G06T 7/337; H04L 9/0643
See application file for complete search history.

(56) References Cited

U.S. PATENT DOCUMENTS

2009/0141934 A1\* 6/2009 Caillon ................ G06V 10/245
382/102
2017/0203335 A1\* 7/2017 Benyoub ............ G06V 30/1914
(Continued)

FOREIGN PATENT DOCUMENTS

WO 2016/203149 A1 12/2016
WO WO-2016203149 A1 \* 12/2016 ........... B07C 5/3422

OTHER PUBLICATIONS

Search Report dated Nov. 11, 2019 issued by the French Patent Office in corresponding Application No. FR 1874212.
(Continued)

*Primary Examiner* — Syed Haider
(74) *Attorney, Agent, or Firm* — Ware, Fressola, Maguire & Barber LLP

(57) ABSTRACT

The method of matching digital images of the same article in a data processor unit comprises the steps of: transforming each digital image of an article into a local divergence topographic map of the luminance gradient vector field; detecting singularities or extrema of local divergence in the luminance gradient vector field, such singularities corresponding to points of interest in said digital image; and, for each detected point of interest, encoding the values for the singularity of the gradient field that are located on a plurality of concentric rings centered on the point of interest so as to derive a digital data vector (210); and transforming said vector into a digital hash key (220) by means of a family of hash functions of the cosine Locality-Sensitive Hashing (LSH) type.

14 Claims, 6 Drawing Sheets

(51) Int. Cl.
  *H04L 9/06* (2006.01)
  *G06T 7/33* (2017.01)

(56) References Cited

U.S. PATENT DOCUMENTS

2018/0089507 A1* 3/2018 Desprez ............... G06V 20/62
2019/0171665 A1* 6/2019 Navlakha ............ G06K 9/6244

OTHER PUBLICATIONS

PCT International Search Report and Written Opinion dated Mar. 10, 2020 issued by the European Patent Office in corresponding Application No. PCT/EP2019/086413, 14 pages.

Chandrasekhar et al., "CHoG: Compressed histogram of gradients A low bit-rate feature descriptor", 2009 IEEE Conference on Computer Vision and Pattern Recognition CVPR 2009; Miami Beach, FL, USA, Jun. 20-25, 2009, IEEE, Piscataway, NJ, Jun. 20, 2009, pp. 2504-2511.

Wang et al., "Hashing for Similarity Search: A Survey", Aug. 13, 2014. Retrieved from the Internet: https://arxiv.org/pdf/1408.2927.pdf [retrieved on Nov. 6, 2019] XP055571085.

* cited by examiner

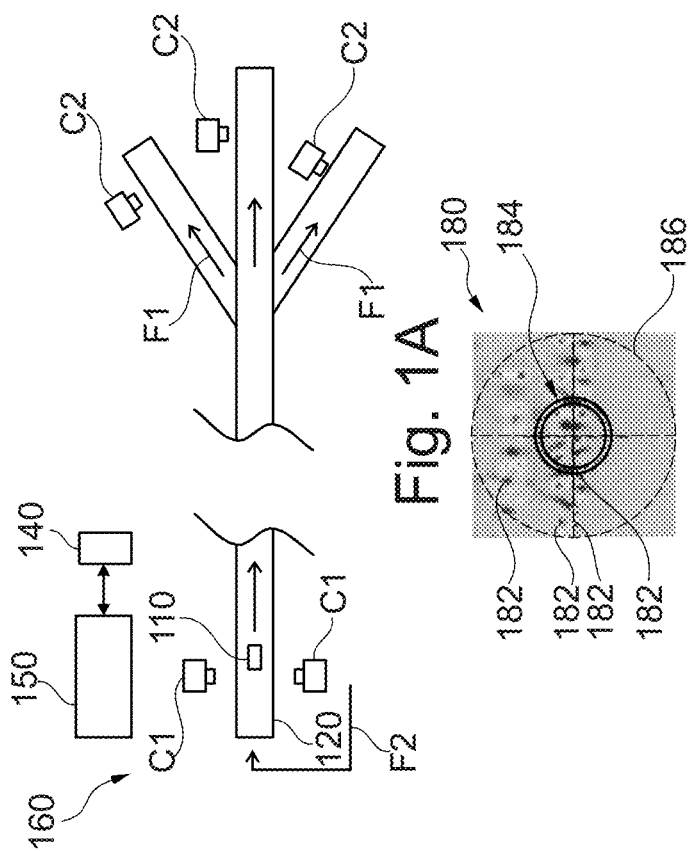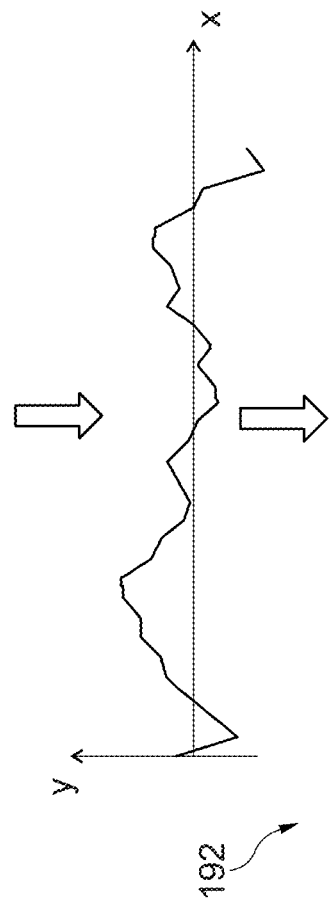

FIG. 5

STRUCTURALLY MATCHING IMAGES BY HASHING GRADIENT SINGULARITY DESCRIPTORS

CROSS REFERENCE TO RELATED APPLICATIONS

This application is the U.S. National Stage of PCT/EP2019/086413 filed on Dec. 19, 2019, which application claims priority under 35 USC § 119 to French Patent Application No. 1874212 filed on Dec. 27, 2018. Both of these applications are hereby incorporated by reference in their entirety.

TECHNICAL FIELD

The invention relates to the field of processing digital images of articles for the purpose of matching or pairing off two digital images of the same article, and in particular two digital images of the same postal article such as a letter, a parcel or a packet, e.g. of the "small import packet" type, in a machine for logistically processing postal articles, such as a postal sorting machine for preparing postal delivery to recipients of postal articles.

PRIOR ART

In order to receive postal articles coming from various sources and in order to deliver them to a large number of recipients, sorting centers are equipped with automated postal sorting systems.

Automation of postal sorting centers requires automated tracking of the parcels in order to check they are routed properly at those centers.

Some tracking methods are based on identifying the postal articles by means of image signatures, which avoids using marking such as bar codes on the postal articles.

In general, an incoming postal article entering a sorting machine goes past a device for taking digital images. The digital image of the article can be processed in a data processor unit to derive an image signature that can serve as a unique identifier for postal delivery of the postal article.

A plurality of image-taking devices can be installed along the path of the postal articles through each of the sorting machines. In addition, the same article can go through the inlet of the same machine a plurality of times if the machine sorting is a multi-pass sorting, for example.

The data processor unit has to be arranged to match or pair off two different images of the same article that were acquired at two different instants.

The matching or pairing method is based on graphical similarity criteria, and the invention thus relates more particularly to a method of matching or pairing off digital images of the same article in a data processor unit of a machine for processing the articles, in which method each digital image of an article includes at least one information zone containing symbols and characters of writing, the method comprising the following data processing steps:

transforming each digital image of an article into a local divergence topographic map of the luminance gradient vector field;

from said topographic map, detecting singularities or extrema of local divergence in the luminance gradient vector field, such singularities corresponding to points of interest in said digital image;

for each detected point of interest, encoding the values for the corresponding singularity that are located on rings centered on the point of interest in the topographic map so as to derive a descriptor of singularity of the gradient field associated with said point of interest; and comparing said descriptors of singularity of two digital images so as to assess graphical similarity between the two images.

Such a method is disclosed in French Patent FR 3 037 691. In that known method, the descriptors of singularity of the gradient field are referred to as "Descriptors of Gradient Singularities" or "DoGS".

Since DoGS, on which the method is based, are "low level" image descriptors (encoding the strength and orientation of the pixel transitions), they constitute an image matching attribute that is particularly robust and generic because, by construction, it is relatively insensitive to variability in the non-symbolic information on the article, and, in the particular case of a postal article: reflections, shadows, deformation of the article or of its surface, image background; slippage of the content wrapped in a plastics wrapper, etc.

Thus, the Points of Interest (POIs) described by the DoGS are, as a priority, extracted from the symbolic information zones having high local gradients, regions containing textual and graphical information that is highly robust from one image acquisition pass to another, including the distinguishing or "discriminating" region of the recipient's postal address.

In order to guarantee reproducibility and location of the POIs on the image, they are specifically extracted at the extrema of divergence in the local gradient vector field. The POIs thus appear at the ends of the letters such as, for example, the letter "t" or "p", on the dot of the letter "i" or indeed in the circle of the letter "o".

That known matching or pairing-off method has proved its capacities for optimizing the performance of a method of virtually identifying an article by image signature, which method is known under Solystic's trademark "V-Id™" (re-identification of postal articles by image signature) and is disclosed in European Patent EP 1 866 105 B1, by reducing, in particular, rejects and errors over the residual problematic population of flat postal articles having Regions of Interest (ROIs) that are difficult to detect or intrinsic physical variability (plastics wrappers, paper inserts under covers, slippage under windows, mailpieces or envelopes that are open, etc.).

The "DoGS" technology has also facilitated opening up the fields of application of matching methods to logistical processing of voluminous articles, to non-machine sorting assistance services for assisting with manual sorting and of the Solystic type known under the trademark "CAMS™", or to recognition of standardized postal articles (administrative forms, stamps, logos, etc.), which are all postal applications in which the significance of the origin and of the conditions of capture of the images that are processed needs to be minimized, and which need to cope with inter-pass variability problems that are less constrained and less controlled than when sorting flat postal articles.

The principle lying behind the DoGS matching method is based on pairing off points of interest (POIs) between pairs of images and then on statistically distinguishing between background POIs (common to the images coming from the same graphical pattern or screentone) and distinguishing or "discriminating" POIs (signing the individualities) within a given search context.

That induces a high propensity of such a DoGS method to segment automatically the textual and graphical structural characteristics of a set of articles.

Such a property is valuable because it is useful in solving many postal sorting problems: clustering/partitioning of articles, flow spectral classification, adaptive filtering of individuals in context, etc. This dual capacity for structural selection and individualization in the structural family is also crucial with a view to going over to the scale of the identification function with matching of postal articles on big image bases (approaches of the Big Data Image type), or indeed merely when the matching maximum context is broad and cannot be reduced, either by predicting sequences of the recycled articles (no assumed contiguousness between them) or by identifying the container of the articles. This situation is almost systematic when re-identifying "small import packets" or more generally voluminous articles (parcels and packets).

Nevertheless, while the time required for extracting POIs and DoGS from an image can be controlled on graphics processors to stay within the operating constraints (<100 milliseconds (ms)), in spite of the spatial optimization of the search for POIs by approximating the rigid transformation between two compared images, the time required for DoGS matching of an image in a context remains dependent on the number of images and on the number of POIs matched or paired off in the context.

That is why image processing functions based on DoGS technology (recycling of Optical Character Recognition (OCR) rejects of flat articles, e-matching for computer-assisted manual sorting ("CAMS™"), detecting the ROI for OCR, etc.) are currently dimensioned to search context sizes that guarantee satisfaction of the real-time constraints.

Therefore, the time required for matching or pairing off the images by means of such descriptors (DoGS) depends on the number of points of interest considered and on the number of reference images to be scanned to detect resemblance with a target image, and therefore the prior art method described above cannot satisfy tough real-time operating constraints with a very large number of reference images, and therefore it is currently used only on limited numbers reference images in order to guarantee satisfaction of the real-time operating constraints, which limits the field of application of the method to sorting letter-type mailpieces.

SUMMARY OF THE INVENTION

An object of the invention is to solve the problem of real-time matching of a target image with reference images in a big database, i.e. a database containing a very large number of reference images, so as to extend its application in particular to postal sorting of parcels, of packets of the "small import packet" type, or of flat articles without identification of containers.

To this end, the invention provides a method of matching digital images of the same article in a data processor unit of a machine for processing the articles, said method comprising the following data processing steps:

transforming each digital image of an article into a local divergence topographic map of the luminance gradient vector field;

from said topographic map, detecting singularities or extrema of local divergence in the luminance gradient vector field, such singularities corresponding to points of interest in said digital image;

for each detected point of interest, encoding the values for the corresponding singularity that are located on rings centered on the point of interest in the topographic map so as to derive a descriptor of singularity of the gradient field associated with said point of interest; and comparing said descriptors of singularity of two digital images so as to assess graphical similarity between the two images;

said method being characterized in that it further comprises the steps of: encoding the values for the singularity of the gradient field in the form of a digital data vector having a plurality of components that are associated with respective ones of a plurality of concentric rings centered on said point of interest, each component of the digital data vector that is associated with a ring being derived from computing the sum of the indices of singularity of the points of the ring in question; and transforming said data vector into at least one digital hash key by means of a family of hash functions of the cosine Locality-Sensitive Hashing (LSH) type, said hash key being representative of the singularity descriptor.

The method of matching of the invention is thus based on approximating the correlation of the descriptors of singularities of the gradient field to be compared by means of a hashing technique known as "cosine Locality-Sensitive Hashing" or "cosine LSH".

Using such an approximation considerably reduces the computing time necessary for matching or pairing off images, and produces results that are sufficiently reliable in terms of occurrences of false positives and of false negatives for the matching method to be used under real-time operating conditions with big databases of reference images of articles such as postal packets or parcels.

The presence of symbols and characters of writing in the images, e.g. in destination addresses on the parcels, and the capacity of the matching method to use and exploit them makes it possible to distinguish or "discriminate" effectively between two parcels or two letter-type mailpieces that are otherwise of similar appearance but that have different delivery postal addresses, without requiring operations that are slow because they involve complex computation, such as methods of detecting the Region of Interest (ROI), and methods of recognizing characters, or of semantically analyzing lines of the delivery postal address.

The method of the invention, referred to below as the "Fast DoGS" method, makes advantageous use of the approximation of the measurement for comparing the descriptors of the POIs by hashing that is sensitive to DoGS similarity.

The Fast-DoGS method makes it possible to shift the computational complexity upstream from the matching process, to the stage for extracting the image signatures, by learning the structural links between the images of the database that form the maximum context.

Said structural links are characterized by the collisions of hashes of the DoGS describing the POIs of the various images over a plurality of hash tables. Thus, by principle, the higher the number of the POIs of two images that fall into identical "buckets" of the same hash table (i.e. the more they have the same "hash" values), the more similar the two images are.

The Fast-DoGS method ultimately makes it possible, in real time, to generate image recognition hypotheses for a target image. The decision criterion for deciding on the order of the hypotheses may relate to all of the selected POIs of the request image or to only those POIs that are considered to be distinguishing or discriminating out of all of the reference images considered, with or without prior pre-filtering of the images of the same structural family.

Since the generated hypotheses can be scored as a function of the number of statistical collisions of the POIs with the target image, it is always possible, depending on the virtual identification application and on the structural uniformity of the flow of articles in the database, to hone the decision over a reduced context of the N best candidates (by spatial or other DoGS matching).

It should be noted that the Fast-DoGS method of the invention is also particularly well suited to solving the problem of matching images of voluminous articles, which images are acquired by multi-face image-taking, since the statistical analysis of the collisions of the POIs extracted from all of the images of the same article, without spatial constraint, completely obviates the need for a preliminary face-associating stage.

The Fast-DoGS method of the invention contributes to bringing novel solutions, in particular to virtual identification applications ("V-Id™") for virtually identifying postage articles and for machine re-identifying flat articles by image, in which applications the problem of large horizons is not solved, the maximum search context currently being limited to all of the trays or bins loaded for any one sorting session with any residuals not emptied.

For optimum real-time operation, the matching requests hitherto needed the maximum search context to be reduced by using physical filters of the flows (scanning of tray identifiers or detection of separators). That was an operating constraint for the client that penalized virtual identification solutions and considerably complicated analysis and interpretation of the system performance of the method.

As regards processing of "small import packets" or of voluminous articles (packets or parcels), distinguishing or discriminating bar codes form a first screen that is natural but insufficient, and graphical and textual structure of the information constitutes a second screen that can, in addition, make it possible to exhibit the zones or regions of interest for the matching.

As regards machine software peripherals that require a graphical or structural classification function for the articles, they, in general, do not work on a big and full dictionary of all of the updated classes of articles but rather they use the dictionaries of the N last models encountered on unstacking. Structural filtering thus remains dependent on the uniformity of the flow of unstacked articles. The Fast-DoGS method of the invention makes it possible to remove the above-mentioned constraints.

The method of the invention for matching images may have the following features:
  said transforming of the data vector comprises: multiplying the data vector by a hash matrix representing the families of hash functions of the cosine LSH type so as to produce a second digital data vector having positive or negative signed components; transforming each component of the second digital data vector (210) into a binary value so as to produce a third vector having binary values; and computing a digital hash key value that corresponds to a conversion of the binary expression represented by the third vector;
  the articles are postal articles, each of which bears delivery postal address information comprising symbols and characters of writing, the concentric rings centered on the point of interest lying within a disk of singularity having a radius of 8 millimeters (mm) for an image resolution of 4 pixels per millimeter (pixels/mm), and the vector of digital data associated with the rings centered on the point of interest being a vector having 32 components for 32 rings;
  each function forming a hash family may be a data vector having 32 components, each of which is chosen randomly and independently from among the values +1 and −1;
  each hash family may be a hash matrix formed by concatenating K hash functions, each of which is represented by a data vector;
  depending on the non-uniformity of the spectrum of postal articles processed, K may be chosen in the range 16 to 64, and is preferably equal to 32, so as to guarantee good accuracy for the POI matching (few false positives); and
  it is possible to compute L digital hash keys for the descriptor of singularities on the basis of L families of hash functions, where L is chosen in the range 4 to 8, so as to guarantee good recall for the POI matching (few false negatives).

The invention also provides a method of sorting postal articles such as letter-type mail, parcels or packets, which method uses the matching method indicated above for matching a target image of a certain postal article with one from among N candidate images associated with N postal articles by using hashing of the cosine LSH type for hashing the DoGS.

In this sorting method, a collision matrix may also be computed for the points of interest on the basis of the hash tables.

In this sorting method, it is also advantageously possible to perform structural filtering of the search horizon, constituted by the candidate images, on the basis of said collision matrix.

In this sorting method, it is also advantageously possible to perform structural clustering/partitioning of the search horizon, on the basis of the collision matrix.

In this sorting method, it is also advantageously possible to generate image recognition hypotheses on the basis of the hash tables.

The invention advantageously further provides a postal sorting machine having a monitoring and control unit specially arranged to implement the method of the invention for processing images.

BRIEF DESCRIPTION OF THE DRAWINGS

The present invention can be better understood and other advantages appear on reading the following detailed description of an implementation given by way of non-limiting example and with reference to the accompanying drawings, in which:

FIG. 1A diagrammatically shows an operation for tracking a parcel at a sorting center;

FIG. 1B shows obtaining a digital data vector representative of the local descriptor of a digital image;

FIG. 5 shows the sum of the accumulated collisions of the POIs per image candidate in context (sum per column of $M_{coll}$).

DESCRIPTION OF AN IMPLEMENTATION OF THE METHOD OF THE INVENTION

The Fast-DoGS method is thus based on approximating a measurement of correlation of local descriptors of Points of Interest (POIs) of images to be mutually compared.

Since the local descriptors are centered and reduced DoGS signals, correlation between the DoGS is equivalent to computing a cosine similarity of the approximation and can therefore be performed, in accordance with the invention, by means of a hashing technique known as "Cosine LSH" or "Cosine Locality-Sensitive Hashing".

The approximation is performed in accordance with the invention by means of a cosine LSH hashing technique applied to indices of singularities of the gradient field in the vicinity of the point of interest and in particular on concentric rings centered on the point of interest insofar as the images include symbols and characters of writing.

Figures 3A, 3B:
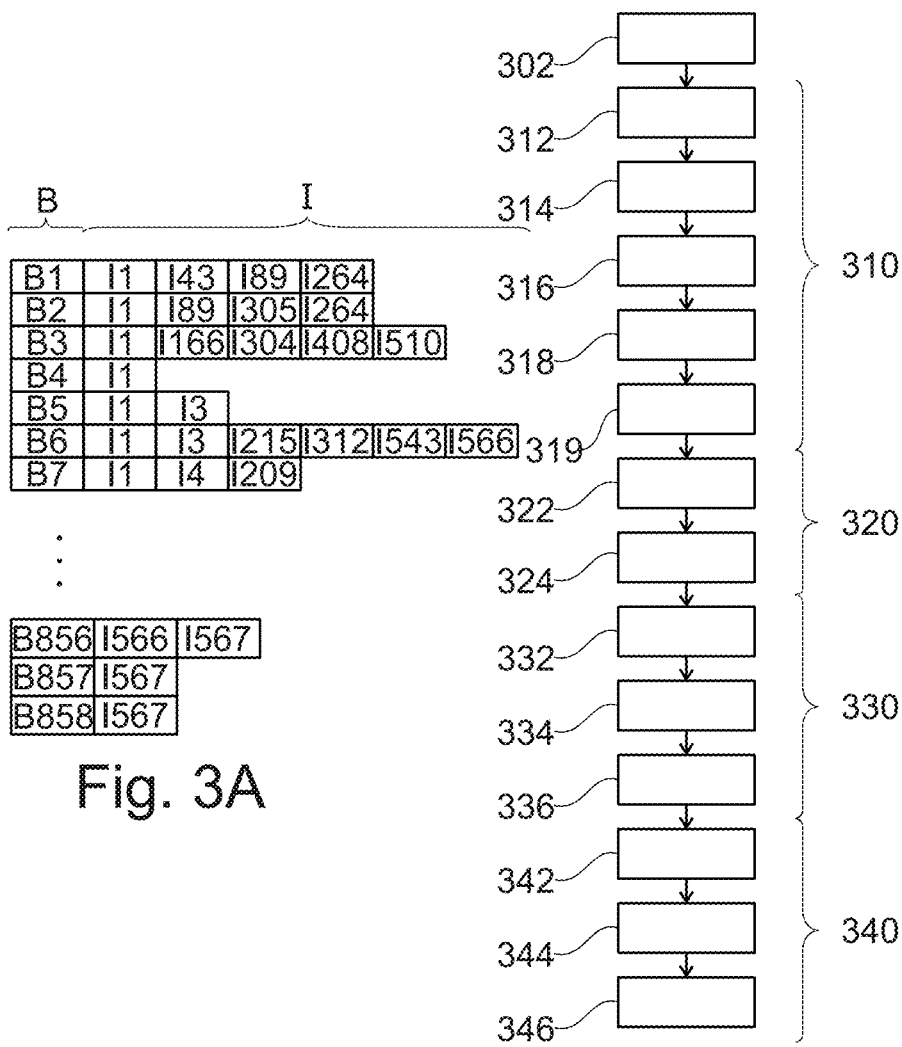
FIG. 3A shows a hash table containing the digital fingerprints.
FIG. 3B shows the set of operations necessary for matching or pairing off two images in the method of the invention.

The matching method of the invention comprises implementing a plurality of steps shown in FIG. 3B, namely:

i) at 310, determining local descriptors characterizing the digital images, these local descriptors being DoGS signals in the Fast-DoGS method;

ii) at 320, defining families of cosine LSH hash functions to be applied to the DoGS signals of the digital images;

iii) at 330, computing hash values by applying a family of cosine LSH hash functions to the DoGS signals; and iv) at 340, matching digital images by means of LSH DoGS hash tables being generated.

It should be noted that, in a process of sorting articles in a plurality of sorting passes, the steps of generating the hash tables are performed in a first sorting pass, while the image matching step iv is performed in a subsequent sorting pass. However, it is possible to generate the hash tables and to perform the matching on the fly without going beyond the ambit of the invention.

On the left of FIG. 3B, the digital processing operations of the four main steps are itemized, a preliminary step being constituted by acquiring digital images at 302 by means of an image-taking device.

Determining Descriptors DoGS of Singularities of the Luminance Gradient Vector Field In order to determine the DoGS signals that are the local descriptors of a digital image of an article of the invention, firstly, at 312, a digital map of the luminance gradient vector field of the image is extracted by local planar regression on, for example, portions of images having sides of 5 pixels, and then, at 314, the image of the singularities of said digital image, a portion 180 of which image of singularities is shown in FIG. 1B, is computed by combining local criteria of circularity, divergence, and/or gradient, each pixel of the image of singularities being associated with a signed singularity index or value giving its grayscale level. The image of the singularities may be seen as a kind of digital topographic map that shows curves of levels of the local divergence of the gradient field with peaks and troughs that are the singularities.

At 316, the local extrema or topological singularities 182 of the image of the singularities shown in FIG. 1B are then detected, said local extrema 182 defining the points of interest (POI) in the digital image and in the image of the singularities.

The local neighborhood of each POI is then described by means of a DoGS signal 190, which is represented, in accordance with the invention, by a data vector 192, each component of which is computed at 318 by summing the indices of singularity of the points lying on a ring 184 having a width of one pixel and centered on the POI in question, the entire set of the rings forming a disk of singularity having a given radius and centered on the POI.

In FIG. 1B, the x-axis shows a distance in pixels to the POI in question, and the y-axis shows the amplitudes of the components of the DoGS signal 190.

Said sums are signed, i.e. they can take positive values (convergence of the vector field of the local gradient) as well as negative values (zones of divergence of the vector field of the local gradient), as a function of the singularity values associated with the pixels of the image of singularity.

After determining the DoGS signals of each of the POIs of a digital image, the digital image is stored in a memory of the data processor unit at 319 in association with the set of DoGS signals that come from said image.

For articles to be sorted that are of the postal article type, each of which is supposed to bear a delivery address block with address lines formed of handwritten or typed symbols and characters of writing, the delivery address block may serve as a distinguishing region for distinguishing the articles and the images of said articles. In accordance with the invention, it has been determined that an appropriate radius for the disk of singularity is 8 mm, with an image resolution of 4 pixels/mm, which is sufficient to detach characters of writing in the image.

Therefore, in this implementation, the DoGS signals are constituted by data vectors of 32 components, each component corresponding to a sum of the singularities situated on a ring having a width of one pixel and centered on the POI, the radii of the rings being incremented successively to take values ranging from 1 pixel to 32 pixels, with one ring per radius.

It is understood that a pixel having its geometrical center lying within one of the rings is considered to be part of that ring.

FIG. 1B shows a data vector 192 that is representative of the DoGS signal 190 derived from a portion 180 of an image of singularities, which image is itself derived from a digital image (not shown) captured by a camera for taking digital images.

More particularly, if it is considered that the disk of singularity of the gradient in the vicinity or neighborhood of said POI (FIG. 3) has an appropriate size of 8 mm (description radius R=32 pixels on an image of resolution 4 pixels/mm) and by considering a mean overlap criterion of three typed lines of recipient address, which lines of address generally constitute the distinguishing region, the similarity measurement used for comparing two DoGS signals $(d_2, d_1)$ describing two POIs $(p_2, p_1)$ is the normalized coefficient of correlation $\rho \in [-1, +1]$.

$$\rho(p_2, p_1) = \frac{COV(d_2, d_1)}{\sigma_{d_2} \sigma_{d_1}} = \frac{\frac{1}{R}\sum_R ((d_2 - \overline{d_2})(d_1 - \overline{d_1}))}{\sqrt{\frac{1}{R}\sum_R ((d_1 - \overline{d_1})(d_1 - \overline{d_1}))} \sqrt{\frac{1}{R}\sum_R ((d_1 - \overline{d_1})(d_1 - \overline{d_1}))}}$$

Since these signals are centered and reduced by construction after the POIs have been extracted from the image, measuring a correlation between two DoGS amounts to computing the scalar product of two vectors of 32 components encoded on 8 bits (the signed integer values of a DoGS are amplitudes considerably less than 128 after application of a real accuracy factor ×10).

$$sim(p_2, p_1) = \rho = \frac{\sum_R d_2 d_1}{\sqrt{\sum_R d_2^2}\sqrt{\sum_R d_1^2}} = \frac{d_2.d_1}{\|d_2\|\|d_1\|} = \cos\theta$$

Measuring similarity between centered and reduced DoGS signals thus amounts to measuring the "cosine similarity" formed by the DoGS vectors on $IR^{32}$ as shown above.

Definition of families of hash functions Below, two images are considered to be similar or not similar on the basis of an approximation of a measurement of similarity of the local descriptors associated with respective ones of the two images, i.e. on the basis of a measurement of similarity of the respective DoGS signals.

As indicated above, a measurement of similarity of the DoGS signals characterizing the POIs is the normalized coefficient of correlation between the two signals.

Since the signals are centered and reduced by construction after determining POIs of the image, measuring a correlation between two DoGS signals amounts to computing the scalar product of the two vectors respectively representing them.

Measuring similarity between centered and reduced DoGS signals thus amounts to measuring the "cosine similarity", and such a similarity measurement can advantageously be approximated by means of the "cosine Locality-Sensitive Hashing" method or "cosine LSH" method in which digital hash values that are each representative of a DoGS signal are computed.

Thus, the invention takes advantage of the fact that two mutually identical or similar DoGS signals have a high probability of having the same digital hash value.

In this implementation of the invention, L different hash values are computed for each DoGS signal by hashing the vector representing it by means of L different families of hash functions, each family being represented as a hash matrix 202 formed by concatenating K hash functions that are themselves each represented by a data vector 204 having the same number of components as the DoGS signals, i.e. 32 components in this implementation.

Each of the functions forming the L families of hash functions is constructed by a value +1 or −1 being randomly and independently assigned to the 32 components of the vectors that represent them.

As described below, approximating the measurement of similarity between two DoGS signals, and thus searching for similarity between two images, is based on comparisons between said hash values.

It can be understood that increasing the value of K, where K>1, increases the accuracy by increasing the fineness of the hashing, and reduces the number of false positives, i.e. matching or pairing off of DoGS that are not similar, such matching increasing the risk of erroneous matching of two images.

In accordance with the invention, K may advantageously lie in the range 16 to 64, and is preferably equal to 32, as in the present implementation.

It can also be understood that increasing the value of L, where L>1, increases the recall, i.e. reduces the number of false negatives by increasing the number of hash values for the same DoGS signal, and thus the probability that at least one of said hash values makes it possible to find a similarity between two DoGS signals and thus, ultimately, to facilitate good matching of two images.

In accordance with the invention, L may advantageously lie in the range 4 to 8, in the present implementation.

The families of hash functions may be prepared in advance and be applied to any new set of new images or to any new current image.

Computing the Hash Values

To obtain the digital hash values of the DoGS signals, the data vectors 192 representative of the DoGS signals are hashed at 332 by means of the matrices 202 representing the families of hash functions by multiplying the vectors by the matrices.

Each scalar product of a DoGS signal vector multiplied by a column 204 of a hash matrix results in a signed digital value 212.

This signed digital value expresses the orientation of the DoGS signal vector relative to the hyperplane defined by the hash function represented by the column in question.

Thus, the product of a DoGS signal vector multiplied by the entire set of the columns of a hash matrix results in a data vector 210 having the same number of components as there are columns in the DoGS signal vector matrix, i.e. K=32 in this implementation, the components having signed, positive or negative, digital values.

Figure 2A:
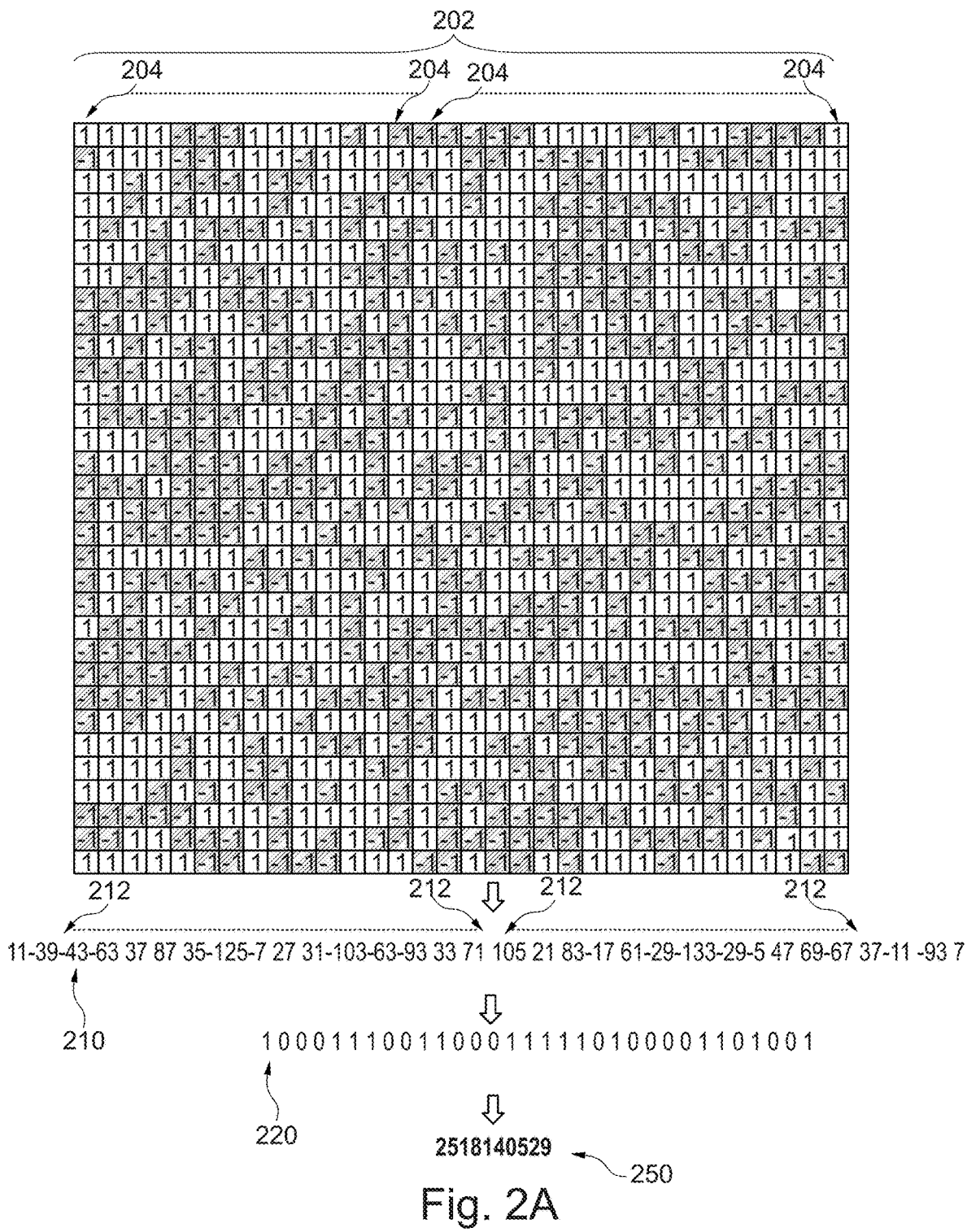
FIG. 2A shows obtaining the hash value of a local descriptor.

In a second stage, the hash key 250 (which is a digital value or fingerprint) of the DoGS signal is obtained by assigning one of the binary values 0 and 1 to each component of said data vector 210, as a function of its sign, e.g. by assigning the value 0 to the negative components and the value 1 to the positive components, as illustrated by the data vector 220 having binary components that is shown in FIG. 2, then by computing the digital value expressed over 32 bits and represented by the sequence of the 32 binary values, this digital value representing the digital value of the DoGS signal and thus of the hash key.

Figure 2B:
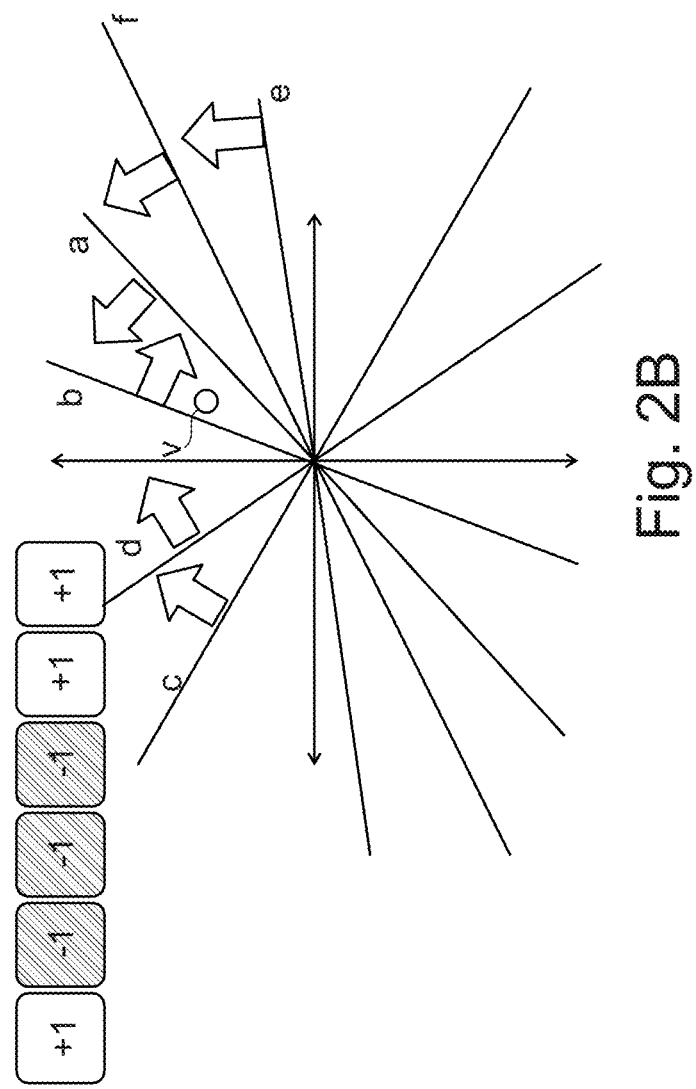
FIG. 2B shows the principle of hashing using a cosine Locality-Sensitive Hashing (LSH) function.

FIG. 2B shows a graphical illustration of this computing process for a two-dimensional space divided up into half-planes by each of the straight lines a to f corresponding to hash functions: depending on the position of the point V representing a DoGS signal vector, i.e. on whether it is above or below each straight line, a positive or a negative value is assigned to the components of the hash key, taken in the order in which the hash functions are considered, from a to f in the illustration shown in FIG. 2B.

Matching of Digital Images

By means of the above-described operations, each POI of a collection of images is associated with a hash key that is characteristic of the local environment of the POI.

The hash values of the descriptors of the POIs are filed, at 242, in buckets of a database in a memory in the processor unit as a function of their values, each bucket receiving one or more images I.

A comparison between the various DoGS vectors (each associated with a POI) is thus performed automatically: two DoGS signals are considered to be similar if they fall into the same bucket.

In accordance with the invention, at 244, L hash tables 350 are advantageously constructed, one for each family of hash functions, by associating each bucket B with the images I that have their POIs associated with a digital hash value filed in the bucket in question following the hashing produced by the respective family.

FIG. 3A shows an example of a hash table 350 that comprises buckets B numbered from to 1 to 858, each associated with images I numbered from 1 to 567 having hash values filed in said buckets.

At 246, a target image is matched with a reference image on the basis of the number of their DoGS signals that are considered as being similar, which amounts to the number of POIs having digital fingerprints that are filed in the same buckets, i.e. on the basis of the number of POIs having local environments that have been assessed as being similar between the two images by the Fast-DoGS similarity approximation computation.

The higher the number of hash values the target image and the reference image have in common, the more the two images are considered to be similar and can be matched if the level of similarity is deemed sufficient by the operative implementing the matching method.

In other words, with the LSH of the descriptors of the POIs having concentric rings, it is possible to construct, in a memory, an ordered database (hash tables) from which it is possible to derive firstly an identification of the images having high graphical similarity, and secondly an identification of the points of interest having high capacity for distinguishing between the images.

When the spectrum of the postal articles processed is uniform (high graphical and textual resemblance of the images), it is naturally possible to take into consideration criteria other than merely the number of POIs having the same hash values between the two images.

For example, it is possible, for a collection of reference images, to establish a list of distinguishing POIs having respective hash values that do not correspond to the hash value of any other POI of a candidate image or to the hash values of at the most N POIs of candidate images, where N is, for example, equal to 1, and to test the similarity of a target image with the reference images by limiting the comparison to a comparison with the hash values of the distinguishing POIs rather than comparing with the entire set of POIs.

In the spirit of the DoGS method, it is then possible to individualize a corresponding image in a set of candidate images that are graphically similar by omitting the common image background and by looking only at the POIs that constitute the potentially distinguishing zones.

Regardless of the degree of sophistication of the matching algorithm used for exploiting the hash tables, matching based on the Fast-DoGS method implements only comparisons between digital values each representative of a point of the image that is defined as a point of interest (POI) during the method, such computations being compatible with real-time operating constraints.

Such matching therefore makes it possible to track and to sort, in real time, a large number of distinct articles without it being necessary to affix identifiers such as bar codes to them.

The Fast-DoGS matching method of the invention has a large number of applications.

By way of example and as shown in FIG. 1A, "small import packets" 110 to be sorted are placed on a sorting conveyor 120 of a sorting machine 160 of a logistics center and are then photographed using cameras C1 for taking digital images in such a manner that first digital images of packets to be sorted are obtained in the upstream portion of the sorting conveyor, preferably with only one packet per digital image.

These packets to be sorted may, for example, arrive at a postal sorting center with a view to them being sorted and delivered to destination addresses. They therefore bear delivery information such as addresses that include characters of text.

The data processor unit 150 that may generally be considered to be the monitoring and control unit of the sorting machine 160 associates the first digital images with local descriptors and then with digital hash values filed in hash tables in accordance with the above-described method 300. The address information is recognized automatically by the unit 150 from the images, and the recognized addresses constituting sorting data may also be stored in a memory 140 in association with the reference images.

In a second stage, downstream from the cameras C1, the packets are directed into sorting outlets indicated by arrows F1, where second images can be taken of them using cameras C2 for taking digital images.

Thus, for each packet at the inlet of the conveyor 120, a second digital image of the packet is acquired and recorded in a memory of the unit 150, which second digital image constitutes the target image that is to be matched with one of the reference images, in order to track and monitor the packet throughout the logistics processing chain that processes the packet, so as to direct the packet towards a sorting outlet.

In the same way as for the first digital images, the data processor unit 150 associates the second digital image with local descriptors 190 and then with digital hash values 250 filed in hash tables 350 in accordance with the Fast-DoGS method.

In a variant, the packet in the sorting outlet may also return to the inlet of the sorting conveyor 20 as indicated by arrow F2 so that a second image of the packet is also acquired by the image-taking means C1.

For the purpose of processing the packets, the first digital images, the second digital image of each packet, and the local descriptors and digital hash value or key are stored in a memory 140 of the data processor unit 150.

As explained above, the unit 150 matches the second image of each packet with that one of the first images that has the most hash values filed in the same buckets as those in which the hash values of the second image are filed so as to retrieve, for example, the postal address information of the packet so that it is logistically processed in the same sorting machine 160.

It can be understood that it is also possible for the process to lead to the second image being matched with a plurality of first reference images and, in such a situation, it is possible to hone the decision by conventional DoGS matching or pairing, or by some other matching or pairing, or indeed to use video-encoding with a human operative, e.g. by displaying the reference first images and the target image on a screen of the video-encoding operative in order to leave the human operative to monitor and control the last stage of the matching.

The Fast-DoGS method of the invention is adapted to structurally matching images of postal articles, such as letters, flat postal articles, parcels, and packets, including "small import packets".

In the DoGS method, the rate of POIs matched with those of a target image is compared either with the total number $POI_{tot}$ of POIs in the target image, or with the subset $POI_{dis}$ of POIs considered as being distinguishing within the search context.

Figure 4:
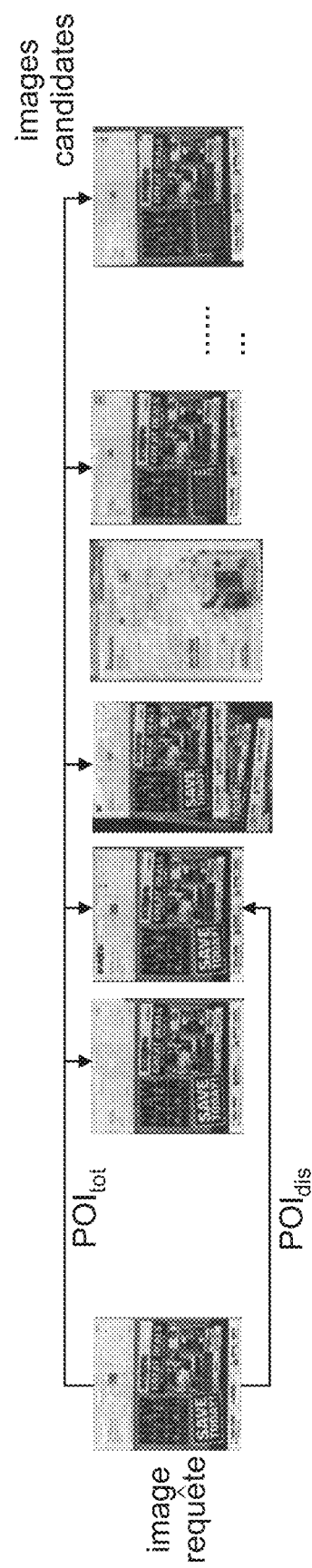
FIG. 4 shows an example of context of postal articles for computing a collision matrix.

The set $POI_{tot}$ is useful for "structurally" selecting the postal articles that share graphical and textual structures with the target image (as applies to the image background for the magazines shown in FIG. 4).

The subset $POI_{dis}$ is useful for individualizing the image corresponding to the image of the request article within the structural family.

The status of "distinguishing POI" is thus relative to a research context. A POI of the target image is considered distinguishing if it has not been matched (by default) or if it has been matched to no more than N candidates (conventionally where N=1). Conversely, it is deduced that a POI being matched or paired off with a plurality of candidates is significant of that POI belonging to a local structure that is common to the entire family of articles and that is not distinguishing between a plurality of articles of that family.

This differentiation between $POI_{dis}$ and $POI_{tot}$ may be taken into account in the Fast-DoGS method by analyzing the "POI collision" matrix illustrated by the tables below.

Figure 5:
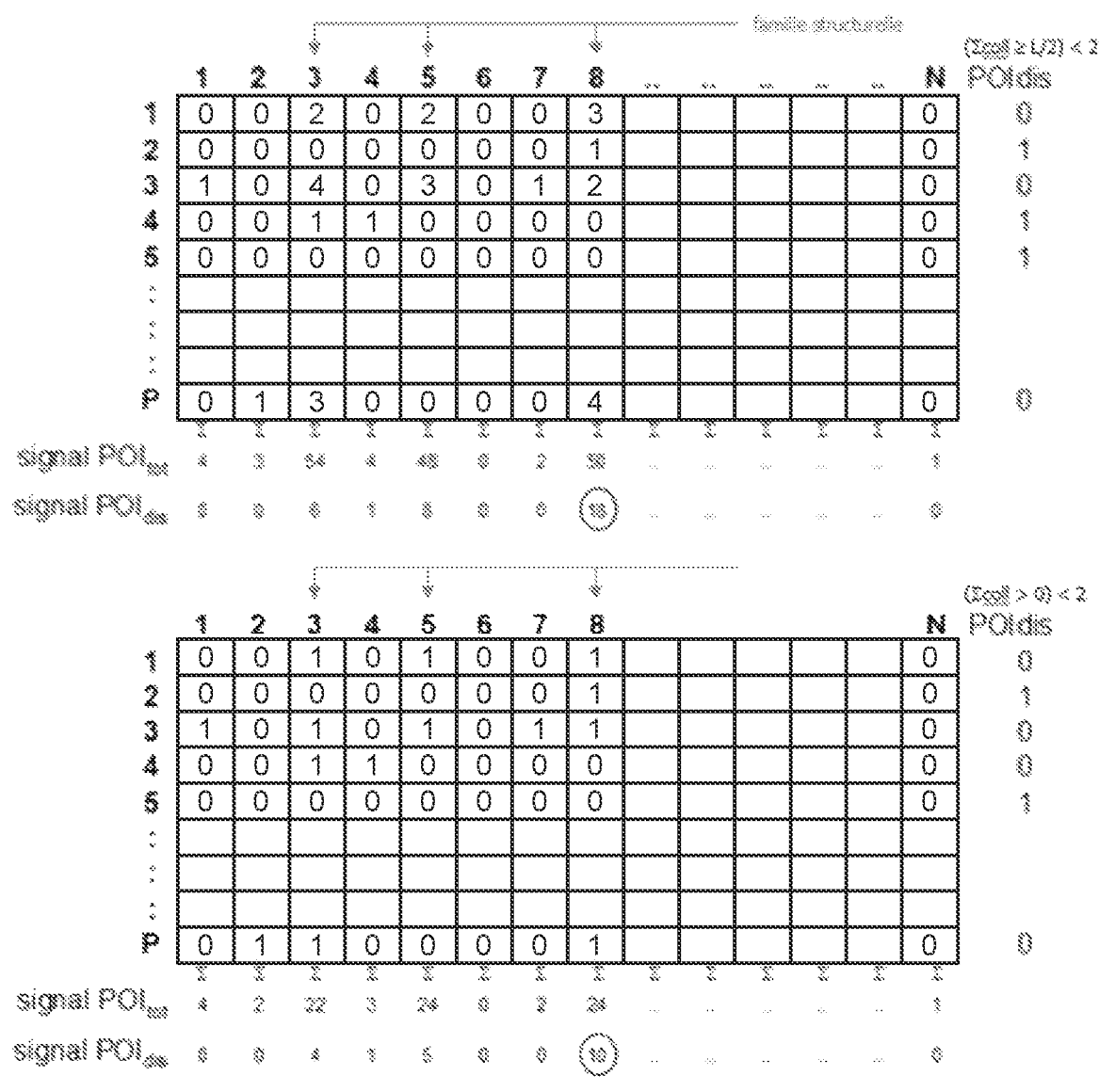

Thus, after hashing of the DoGS of the P Points of Interest (POIs) selected from the target image according to the L LSH families considered when generating the L tables, it is possible, for each searched-for POI p, to take into account the number of candidate images colliding in a bucket, and to do so, with or without accumulation over the L hash tables following the algorithm below:
→ initialize the matrix $M_{coll}(p, i)$ with p=[1, P] and P i=[1, N] candidate images
↻ for each POI p of the request image
→ compute the L hashes $h_p^1, h_p^2, \ldots, h_p^L$
↻ for each table 1
→ increment $M_{coll}[p, i] = M_{coll}[p, i]+1$ of each $i \subset h_p^l$ As shown in FIG. 5, the sum of the accumulated collisions of the POIs per image candidate in context (sum 30 per column of $M_{coll}$) delivers the signal $POI_{tot}$ in which the amplitude of the samples expresses the extent to which the candidate belongs to the structural family of the target image.

A POI is set to the distinguishing status if it is not matched with more than one candidate of the context, matching with a candidate being effective if the number of collisions is greater than L/2 for the matrix with accumulation over L tables and if the number of collisions is non-zero for the matrix without accumulation over the L tables. The signal $POI_{dis}$ expresses the number of collisions, per candidate, of the distinguishing POIs of the request image.

The Fast-DoGS method of the invention may advantageously apply to the structural filtering. In this application, a target image of a postal article and a set of image individuals that constitute the reference space are available. From this search context, it is sought to extract the minimum subset of individuals that have maximum structural similarity with the target individual.

The signal $POI_{tot}$ coming from the matrix of collisions in context of the POIs of the target image is representative of the statistical accumulation of the luminance structures that are common among the candidates.

Various conventional algorithms may be used to find the optimum cut-off threshold for the amplitudes of the signal, with effectiveness that depends on the spectrum of articles in question (small or large format flat articles, "small import packets", packets, population that is very uniform or not very uniform).

While the method of structurally filtering postal articles can make it possible to initiate a process of matching individuals over big image bases by structurally preselecting the candidates, it can, on a spectrum of postal articles that are highly non-uniform, directly individualize the target image in context. For example, it is possible to have a $POI_{tot}$ match of an article of the postcard type over a horizon of in the range several tens of thousands to several hundreds of thousands of letter-format flat articles.

The Fast-DoGS method of the invention may also apply to structural clustering. In this application, a set of reference images is available that it is sought to distribute into groups of individuals sharing common graphical and textual characteristics. It is thus necessary to maximize the structural similarity between the individuals of the same group and to' minimize the similarity between the groups. The constraints of the clustering depend on the criterion of uniformity of the partitions (groups of individuals) and on the application: "over-clustering" or "under-clustering" should be preferred.

Like structural filtering, prior partitioning of the individuals forming the maximum search horizon may constitute the first stage of a matching problem for accelerating and optimizing the individualization second stage: preselecting the clusters that are closest to the target image individual by measuring similarity with the reference individuals of the groups.

Regardless of the algorithm used for the clustering, it may be necessary to have a metric for comparison between the individuals (distance).

The LSH of the DoGS of the selected POIs in each image individual makes it possible rapidly to construct the similarity matrix that expresses the structural proximity between each of the individuals in the reference space. The statistical collision of the POIs of the images by grouping together in buckets lends itself naturally to building such a matrix.

The similarity values of the matrix may, for example, serve as a basis for an ascending hierarchical classification procedure that consists in progressively merging the clusters by cost of decreasing similarity (iterative cost of the partition) and makes it possible to obtain a dendrogram. The cut-off of the dendrogram may depend on the maximum number of partitions desired or on an intra-cluster uniformity threshold.

The Fast-DoGS method of the invention may also advantageously apply to generating recognition hypotheses. In this application, a target image of a postal article is available as is a search horizon of N candidate images that is wide enough for it to compromise use of a conventional methodology: broad horizon to be processed in real time or big horizon of several tens of thousands of images to several millions of images:

Assuming that the searched-for article has a corresponding image in the search horizon, the aim is to obtain the H minimum best recognition hypotheses for the target image including the correct solution.

The H image recognition hypotheses (IRHs) can then enter an automatic decision processes (taking into account the absolute and relative reliability of the scored hypotheses or applying another distinguishing criterion) or a supervised decision process (validation by a human operative as applies to the "CAMS" computer-assisted manual sorting).

The method used for generating IRHs combines all of the following processes:
Generating the LSH DoGS hash tables;
Extracting the POIs from N images and computing their DoGS descriptors;
Setting the LSH hashing configuration: precision K-bits and number L of tables;
Creating L families of cosine Locality-Sensitive Hashing (LSH) functions;
Setting the mode of selection of the POIs (selective or non-selective); and LSH DoGS hashing and filling the L tables, as the hashing progresses or in deferred time; and Structural matching of the image;

Extracting the POIs from the target image and computing their DoGS descriptors;

Setting the mode of selection of the POIs (if the original extraction is selective or non-selective);

DoGS hashing according to the L LSH families and constructing the collision matrix $M_{coll}$ Computing the $POI_{tot}$ signal representative of the global structural similarities of the N candidates;

Conditional thresholding of the $POI_{tot}$ signal for structurally filtering the N'<N candidates;

Identifying the distinguishing POIs in the context of the N or N' candidates;

Sorting the hypotheses according to the $POI_{tot}$ collisions with or without accumulation over the L tables;

Sorting the hypotheses according to the $POI_{dis}$ collisions with or without accumulation over the L tables; and Generating the H best hypotheses by $POI_{tot}/POI_{dis}$ combination with or without accumulation of the collisions over the hash tables.

The $POI_{tot}$ filtering for preselecting the N' candidates that are structurally close to the target image may be triggered in conditional manner by automatically analyzing the $POI_{tot}$ signal (curvature, modes of the histogram, etc.).

As presented above, the matching performance of the Fast-DoGS method can benefit from an improvement of the recall, by overflow of the search for the DoGS hash h over the 32 hashes h' that are such that the Hamming distance between h and h' is equal to 1, without any significant risk of increasing the number of false positives if consideration is given to the accumulation of the collisions over the L hash tables.

The invention claimed is:

1. A method of sorting articles with a sorting conveyor, comprising obtaining first digital images of the articles with first cameras in an upstream portion of the sorting conveyor and obtaining second digital images of the articles with second cameras downstream from the first cameras, the second images constituting target images to be each matched with one of the first images by means of a data processor unit of a machine for processing the articles, said method comprising the following data processing steps:

transforming each of the first and second digital images into a local divergence topographic map of a luminance gradient vector field;

from said topographic map, detecting singularities or extrema of local divergence in the luminance gradient vector field, such singularities corresponding to points of interest (POIs) in said each digital image;

for each detected point of interest, encoding values for the corresponding singularity that are located on rings centered on the point of interest in the topographic map so as to derive a descriptor of singularity of the gradient field associated with said point of interest; and comparing said descriptors of singularity of one of the second digital images with said descriptors of singularity of one of the first digital images so as to assess graphical similarity between these two images in order to track and monitor the article corresponding to the second image throughout the sorting, so as to direct the article towards a sorting outlet;

wherein the method further comprises the steps of: encoding the values for the singularity of the gradient field in the form of a digital data vector having a plurality of components that are associated with respective ones of a plurality of concentric rings centered on said point of interest, each component of the digital data vector that is associated with a ring being derived from computing the sum of the indices of singularity of the points of the ring in question; and transforming said digital data vector into at least one digital hash key by means of a family of hash functions of the cosine Locality-Sensitive Hashing (LSH) type, said hash key being representative of the singularity descriptor.

2. The method according to claim 1, wherein said transforming of the digital data vector comprises: multiplying the data vector by a hash matrix representing the families of hash functions of the cosine LSH type so as to produce a second digital data vector having positive or negative signed components; transforming each component of the second digital data vector into a binary value so as to produce a third vector having binary values; and computing a digital hash key value that corresponds to a conversion of the binary expression represented by the third vector.

3. The method according to claim 2, wherein the articles are postal articles, each of which bears delivery postal address information comprising symbols and characters of writing, and in that the concentric rings centered on the point of interest lie within a disk of singularity having a radius of 8 mm for an image resolution of 4 pixels/mm, and in that the vector of digital data associated with the rings centered on the point of interest is a vector having 32 components for 32 rings.

4. The method according to claim 3, wherein each function forming a hash family is a data vector having 32 components, each of which is chosen randomly and independently from among the values +1 and −1.

5. The method according to claim 4, wherein each hash family is a hash matrix formed by concatenating K hash functions, each of which is represented by the data vector.

6. The method according to claim 5, wherein K is chosen in the range 16 to 64.

7. The method according to claim 6, wherein L digital hash keys are computed for the descriptor of singularities on the basis of L families of hash functions, where L is chosen in the range 4 to 8.

8. The method according to claim 7, wherein a collision matrix is computed for the points of interest on the basis of the hash keys.

9. The method according to claim 8, wherein structural filtering of a search horizon is performed on the basis of said collision matrix.

10. The method according to claim 8, wherein structural clustering of the search horizon is performed on the basis of the collision matrix.

11. The method according to claim 10, wherein image recognition hypotheses are generated on the basis of hash tables.

12. A method of sorting postal articles comprising letter-type mails, parcels, or packets, wherein the method according claim 1 is used for matching a target image of a certain postal article with one from among a number N of candidate images associated with the number N of postal articles.

13. A postal sorting machine, comprising a monitoring and control unit specially arranged to implement the method according to claim 12.

14. The method according to claim 1, wherein the articles are postal articles, each of which bears delivery postal address information comprising symbols and characters of writing, and in that the concentric rings centered on the point of interest lie within a disk of singularity having a radius of 8 mm for an image resolution of 4 pixels/mm, and in that the vector of digital data associated with the rings centered on the point of interest is a vector having 32 components for 32 rings.

\* \* \* \* \*